United States Patent Office 3,129,138
Patented Apr. 14, 1964

3,129,138
PROCESS OF EXTRACTING *PLEIOCARPA MUTICA*
Francis A. Hochstein, New London, Conn., assignor to Chas. Pfizer & Co., Inc., New York, N.Y., a corporation of Delaware
No Drawing. Filed June 17, 1960, Ser. No. 36,758
9 Claims. (Cl. 167—67)

This invention relates to hypotensive agents, and more particularly to a newly isolated hypotensive principle obtained from species of Pleiocarpa plants, and to concentrates containing the same. It further relates to processes for the isolation and purification of these products, to pharmaceutical compositions containing them, and to methods for the treatment of hypertension.

It has been discovered that lower-alkanol-soluble and substantially chloroform-insoluble extracts of the root and bark of *Pleiocarpa mutica* produce profound and sustained hypotensive effect when administered by a variety of modes, including the oral. This is a particularly valuable property, since many available hypotensive agents must be administered intravenously for maximum physiological response. The newly isolated extracts are useful in the treatment of hypertension, and are characterized by remarkably high potency and freedom from undesirable side effects at therapeutically effective levels.

*Pleiocarpa mutica*, of the order Apocynaceae, is found in tropical Africa. Both bark and root have been discovered to contain the newly recognized hypotensive principle, and procedures have been found for its isolation. For best results, the plant members are first subdivided or pulverized, and the active material may then be recovered by solvent extraction. The lower alkanols, such as methanol, ethanol, or the propyl, butyl or amyl alcohols, are suitable solvents, and those containing up to 4 carbon atoms are preferred. Water extracts of *P. mutica* may also be prepared. The latter exhibit hypotensive activity in the dog, and are characterized by very gradual onset of blood-pressure depression, even when administered intravenously.

Extraction may be conducted at room temperature, but for speed and efficiency elevated temperatures are preferred. It has been found especially useful to extract with methanol at reflux temperature. Only about 10% of the plant solids are extracted by these procedures. The volume of solvent employed is therefore not critical, and will usually be selected on the basis of handling convenience. From about one to three extractions with about 2-10 volumes of solvent are both effective and convenient.

The extracts obtained in this manner contain the active alkaloid principle along with a major proportion of pharmacologically uninteresting impurities. The latter may be removed by washing an aqueous solution of the extracted substances at a pH of about 8-11 with a chlorinated hydrocarbon, such as chloroform, dichlorethylene, trichlorethylene, trichloroethane, methylene chloride or ethylene chloride, in which the desired active principle is relatively insoluble. The lower-alkanol extract may be suitably prepared for this washing by concentration followed by dilution with water. One procedure which has been found particularly effective involves concentration of a methanol extract in vacuum to about 10-30% solids content, and dilution of the concentrate with sufficient 5-10% aqueous acetic acid to provide a solution containing 10-25% methanol. This solution may then be washed with benzene and/or hexane to remove a portion of the impurities, adjusted to pH 8-11 with sodium hydroxide or other base, and finally washed with the chlorinated hydrocarbon. This more elaborate procedure is not essential, but generally effects a higher purification, since a portion of the impurities are removed prior to the chlorinated-hydrocarbon extraction. The proportions of solvent are not critical, but it is usually convenient to employ from about ¼ to about 2 volumes of each solvent per volume of aqueous solution. Among the chlorinated hydrocarbons, chloroform is convenient and gives excellent results.

The active hypotensive principle may now be recovered from the washed aqueous solution by extraction with a water-insoluble lower alkanol, such as butyl or amyl alcohol. Butanol is the preferred solvent, and from about 2 to 4 extractions with about one volume of solvent per volume of aqueous may be employed to insure complete extraction. The combined alcohol extract is then concentrated to recover the product. If some sodium acetate or other salts separate during concentration, these may be recovered by filtration, and concentration of the filtrate then continued to dryness.

The resulting alkaloid concentrate represents only about 0.5-1% of the original plant solids and may be employed for therapeutic purposes as such. It is believed that the active principle is an N-acyl indole, but this has not been established, nor is it definitely known that the active principle is a single chemical entity. The $LD_{50}$ (oral) in mice is about 55 mg./kg.

It will often be desirable to further enhance the potency of the product by further refining procedures which serve to separate residual impurities. A variety of processes may be employed alone or in combination to effect such further refining. The hypotensive alkaloid concentrate may, for example, be precipitated from aqueous solution in the form of the free base or a salt thereof. This is conveniently accomplished by dissolving a solid concentrate in dilute aqueous acid, e.g. 10% acetic acid, followed by treatment with an appropriate reagent. For precipitation of the free base, it is ordinarily sufficient to treat with sufficient base, suitably ammonium hydroxide or a water-soluble bicarbonate, to adjust the solution pH to about 8. If it is desired to precipitate the hypotensive principle in the form of the nitrate, an aqueous solution of a nitrate salt, such as ammonium nitrate, may be added to the alkaloid concentrate in aqueous acetic acid. An amorphous, water-insoluble picrate may be precipitated from dilute aqueous acetic acid solution by addition of picric acid, suitably in the form of a saturated aqueous solution. In contrast to the insolubility of the picrate, other salts such as the nitrate, hydrochloride and perchlorate are relatively water-soluble. The latter are, however, much less soluble in the presence of an excess of the corresponding anion, and these salts are therefore most effectively precipitated by employing an excess of the corresponding reagent, e.g. of ammonium nitrate.

The picrate may be conveniently converted to the corresponding acetate by treatment with a weakly basic anion exchange resin in the acetate cycle. A variety of such resins are commercially available. These include, for example, Amberlite IR-4B and IR-45, available from the Rohm & Haas Co. of Philadelphia; Dowex 3, manufactured by the Dow Chemical Co. and available from the Nalco Co. of Chicago; Duolite A-2, available from the Chemical Process Co. of California; and Permutit W, available from the Permutit Co. However, if desired, such resins may be prepared by methods well known to those skilled in the art. According to one such method, a phenol such as bisphenol A (isopropylidene-p,p'-bisphenol) is condensed with formaldehyde and triethylene tetramine to furnish a resin containing primary, secondary and tertiary amino groups. Alternatively, the cross-linked resin beads obtained by the free-radical suspension copolymerization of styrene and divinylbenzene are chloromethylated by treatment with chloromethyl ether in the presence of anhydrous aluminum chloride catalyst. The resulting product is subsequently treated with ammonia or primary or secondary amines, such as diethylene triamine, or dimethyl- or diethylamine. The resulting hydrochloride of the aminated resin may then be neutralized to the free base form. Such procedures are described in British Patent 601,321 (1948); Journal of Applied Chemistry, London, I, p. 124 (1951); and in numerous other publications.

Owing to the water insolubility of the picrate salt, it will generally be dissolved in an alcohol such as methanol or ethanol for treatment with the acetate form of the anion exchange resin. The resin may be stirred with the alcohol solution to effect conversion to the acetate, but it is generally preferable to pass the solution slowly over the resin contained in a column. Evaporation of the column effluent provides the solid alkaloid concentrate in the form of the acetate salt.

Another useful procedure for further refining of the new alkaloid concentrates is countercurrent solvent distribution. A number of solvent systems are suitable, including aqueous acetic acid with butanol, amyl alcohol or a higher ketone. A small proportion of hexane, say about 10%, may be also included in the organic solvent selected. A particularly effective countercurrent solvent system is aqueous acetic acid with 9:1 butanol:hexane. Proportions of the aqueous and organic phases are not critical, but about 3 to 5 volumes of aqueous phase for each 5 volumes of organic phase are convenient. The fractions high in active material may be detected by paper chromatographic procedures more fully described hereinafter, or by hypotensive evaluation in laboratory animals.

Following the described purification procedures, a highly refined hypotensive alkaloid principle is obtained which is characterized by remarkably high pharmacological potency. This product, in the form of its nitrate salt, exhibits ultraviolet absorption maxima in 0.01 N methanolic HCl at about 273 m$\mu$, $$E_{1\ cm}^{1\%} \text{ about } 189$$

and at about 305 m$\mu$ (shoulder), $$E_{1\ cm}^{1\%} \text{ about } 127$$

An ultraviolet absorption minimum is located at about 250 m$\mu$, $$E_{1\ cm}^{1\%} \text{ about } 170$$

Infrared absorption maxima in potassium bromide are observed at about 3, 3.4, 5.8, 6.2 and 7.3 microns. Paper chromatography on calcium acetate-treated paper in 50:50 toluene:acetone equilibrated with 2% aqueous calcium acetate gives an $R_f$ value of about 0–0.2.

The alkaloid concentrates of the present invention produce profound and sustained hypotensive response when administered to normotensive and hypertensive laboratory animals. When they are administered by intravenous injection or infusion, onset of blood pressure depression is immediate and the pressure falls rapidly to its minimum level where it usually remains for at least two hours. Oral administration has also been effective in unaesthetized rats and anaesthetized and unanaesthetized dogs. The dosages which produce these results will naturally vary somewhat depending upon the form of the concentrate, the refining to which it has been subjected, and the mode of administration. However, profound effects are ordinarily observed at dosages not exceeding 100 mg./kg. and usually much lower levels, for example, from about 0.5 to about 3 mg./kg., are required. The more refined concentrates produce such effects at dosage levels of 0.1 mg./kg. and even lower. The effects are characterized by an absence of change in heart rate or configuration of the lead II electrocardiogram recording. At the peak of hypotension, heart rate does not differ significantly from the pretreatment control measurement.

The new alkaloid concentrates obviously differ in their action from other natural extracts reported in the literature. They differ from reserpine and the other hypotensive alkaloids of Rauwolfia in their rapid induction of blood pressure depression, but share their prolonged hypotensive effect. Administration of the partially refined extracts by various modes, including intravenous injection or infusion, oral administration, and intraduodenal infusion, in the dog is characterized by substantial inhibition of post-treatment pressor response to epinephrine. Pretreatment intravenous administration of 3 mcg./kg. epinephrine in the dog shows the characteristic relation between mean arterial pressure and the pressor response. For example, pretreatment epinephrine administration at a blood pressure of 120 mm. produces about 60% rise in blood pressure, whereas at 144 mm. it produces only about 45% rise. In contrast, post-treatment epinephrine administration produces on the average only about a 20% rise, which is largely independent of mean arterial pressure. In the case of epinephrine, no blood pressure reversal is produced by treatment with the various *P. mutica* extracts. Treatment with these partially refined extracts is also characterized by partial block of pressor response to 30 second bilateral carotid occulsion and to 20 mcg./kg. dimethylphenylpiperizinium iodide. Treatment with these extracts has shown no effect on the depressor effect of right vagal stimulation (15 volts, 100 c.p.s.). While we do not wish to be limited to any specific mode of action, it is believed that observed diminished pressor response to epinephrine and dimethylphenylpiperizinium iodide is not due to anti-adrenergic action, but rather possibly to non-specific smooth muscle (anteriolar) relaxation.

The new hypotensive agents and their salts containing pharmaceutically acceptable anions may be employed in the treatment of hypertension. By a pharmaceutically acceptable anion is meant one which is well tolerated at the therapeutically effective dosage levels. Examples of such anions include the acetate, nitrate, chloride, sulfate, citrate, pamoate, tartrate, gluconate and succinate anions. These agents may be administered by a variety of routes. Intravenous administration is rapidly effective, but the products are also well absorbed intraduodenally and may be administered via the oral route. Therapeutic compositions, ordinarily containing at least about 0.1% by weight of the new concentrates, may be prepared in non-toxic, pharmaceutically acceptable diluents, i.e. those that are well tolerated at the effective dosage levels. Of course, even lower concentrations than 0.1% may be employed, but the higher levels will usually be preferred to avoid administration of excessively large quantities of diluent. The choice of diluent, whether solid or liquid, will depend on the properties of the particular concentrate and the route of administration. For intravenous administration it is convenient to employ dilute sterile aqueous solutions, or aqueous solutions isotonic in glucose or sodium chloride. For oral administration the new extracts may be blended with excipients such as starch, milk sugar, certain types of clay, and the like, and formed into tablets or filled into capsules. They may also be administered orally in the form of liquid suspensions or solutions. The optimum dosage for the individual patient will be determined by the physician and it will vary with the particular product employed, the mode of administration, and the age, weight, and response of the particular individual. In man the dosage unit will generally be from about 5 to about 100 mg. daily.

The following examples are provided by way of illustration and should not be interpreted as limiting the invention, many variations of which are possible without departing from the spirit or scope thereof.

*Example I*

Ground bark of *Pleiocarpa mutica* is heated at reflux temperature with about four volumes of methanol for one hour. The resulting slurry is filtered and the solids are reextracted in the same manner with fresh methanol. The combined extracts, which contain about 10% of the weight of the original ground bark, are concentrated in vacuum to about 20% w./v. solids and diluted with sufficient 10% aqueous acetic acid to yield a solution containing about 20% methanol.

This solution is extracted at room temperature with two half volumes of hexane to remove fats, waxes and other impurities. The aqueous layer is then adjusted to about pH 9 with sodium hydroxide and extracted with two half volumes of chloroform to remove impurities. The aqueous layer is next extracted with three equal volumes of n-butanol. The butanol extracts are combined, adjusted to pH 5 with acetic acid, concentrated in vacuum to about 0.1 volume, and filtered from precipitated sodium acetate. The clear filtrate is now evaporated in vacuum to dryness, and the solid product is reserved for test and for further purification.

*Example II*

The procedure of Example I is repeated, employing ground root of Pleiocarpa mutica in place of bark.

*Example III*

Ten grams of the dried product of Example I are dissolved in 250 ml. 10% aqueous acetic acid and adjusted to pH 8 with 1 N aqueous sodium bicarbonate. About 1.8 grams of precipitated solids are recovered by filtration and reserved for test and for further purification.

*Example IV*

200 mg. of the precipitated product of Example III are agitated with 10 ml. 2% aqueous sodium hydroxide, and 100 mg. insoluble solids are recovered by filtration and reserved for test.

*Example V*

500 mg. of the precipitated product of Example III are dissolved in 0.5 ml. 10% aqueous acetic acid and 2 ml. 25% aqueous sodium chloride are added. The resulting amorphous precipitate is separated by filtration and the clear filtrate is adjusted to pH 8 with aqueous ammonium hydroxide. The resulting slurry is filtered and 100 mg. of solid concentrate recovered and reserved for test.

*Example VI*

170 grams of the dried product of Example I are dissolved in a mixture of 100 ml. glacial acetic acid and 100 ml. water. The solution is then diluted with 1500 ml. water and filtered to remove a trace of insoluble material. To the clear filtrate is added 2 liters of saturated picric acid solution and the resulting 60 grams of amorphous precipitate are recovered by filtration and reserved for test and for further refining.

*Example VII*

230 grams of amorphous picrate prepared as described in Example VI are dissolved in 10.5 gallons methanol and passed over a column containing 2 liters of Amberlite IR-45 resin, a weakly basic polyamine anion-exchange resin having an approximate exchange capacity of 5.0 meq./g. or 2.0 meq./ml., available from the Rohm & Haas Company of Philadelphia, in the acetate cycle. The solution is passed over the column at a rate of one gallon per hour and followed by 2 liters of fresh methanol. The column effluent is combined and evaporated to dryness in vacuum. The 160 grams of acetate obtained are reserved for test and for further refining.

*Example VIII*

115 grams of the acetate obtained in Example VII are dissolved in 750 ml. 15% aqueous acetic acid previously equilibrated with 90:10 butanol:hexane. The solution is subjected to countercurrent distribution in a 10-tube system with 1100 ml. portions of 9:1 butanol:hexane and 750 ml. portions of 15% aqueous acetic acid. Two liters of hexane are added to each of tubes 8 and 9 (i.e. the last two tubes) and the solutions agitated to force the desired product into the aqueous phase. The two aqueous layers are each separated from the organic layers, combined, and evaporated in vacuum. The resulting 30 grams of dry product are reserved for test and for further purification. Additional product, of somewhat lesser purity, is obtainable from tube 7.

*Example IX*

15 grams of dry product obtained as described in Example VIII are dissolved in 175 ml. water with adjustment to pH 4 with glacial acetic acid. To the solution is added 17.5 ml. 20% aqueous ammonium nitrate and the resulting precipitate is separated by filtration and washed with a small volume of 2% aqueous ammonium nitrate. The washed solid is dried in vacuum.

The dried product exhibits ultraviolet absorption maxima in 0.01 N methanolic HCl at 273 m$\mu$ $E_{1\,cm.}^{1\%} = 180$ and at 305 m$\mu$ (shoulder), $E_{1\,cm.}^{1\%} = 127$.

$E_{1\,cm.}^{1\%}$ at 220 m$\mu$ (no peak) = 590

An ultraviolet absorption minimum is located at 250 m$\mu$ $E_{1\,cm.}^{1\%} = 170$ Infrared absorption maxima in potassium bromide are observed at about 3, 3.4, 5.83, 6.15–6.3, 7.3 microns, and at higher wavelengths. Elemental analysis indicates about 57% carbon, about 6% hydrogen, and about 7% nitrogen. One millimole of picric acid precipitates about 300 mg. of the alkaloid concentrate from aqueous solution.

Paper chromatography studies are made employing Whatman No. 4 paper previously impregnated with 2% aqueous calcium acetate and dried. The mobile phase is prepared by equilibrating 2 volumes toluene, 2 volumes acetone, and 1 volume 2% w./v. aqueous calcium acetate, and discarding the lower aqueous phase. Employing the upper layer as the mobile phase, a characteristic ultraviolet-absorbing spot is detected close to the origin with the purified alkaloid concentrate, $R_f = 0$–0.2. The spot gives a characteristic pink to purple spot upon application of sodium iodoplatinate solution by spray or dip.

*Example X*

Products of the preceding examples are evaluated for hypotensive activity in dogs. In each test, the animal is anaesthetized by intraperitoneal administration of 35 mg./kg. sodium pentobarbital. Following induction of anesthesia a tracheotomy is performed, and direct blood pressure measurements are made by cannulating an exposed femoral artery and recording on smoked kymograph paper through a mercury manometer.

Materials under study are prepared as 1% solutions in 0.01% acetic acid and administered by intravenous injection into the contralateral femoral vein. Onset of blood pressure depression is quite rapid and maximum hypotension is reached within several mintues. Results obtained are as follows:

| Product | Dose, mg./kg. | Mean Arterial Blood Pressure | | | | Duration of Response, min. |
|---|---|---|---|---|---|---|
| | | Control, mm. | Response, mm. | Change, mm. | Percent Change | |
| Example: | | | | | | |
| 1 | 4.3 | 167 | 100 | −67 | 40 | >75 |
| 2 | 1.0 | 109 | 76 | −33 | 30 | 200 |
| 3 | 3.4 | 130 | 70 | −60 | 46 | >30 |
| 4 | 0.4 | 154 | 90 | −64 | 42 | >115 |
| 5 | 1.0 | 103 | 41 | −62 | 60 | 70 |
| 8 | 1.4 | 118 | 32 | −86 | 72 | >60 |

*Example XI*

Products of the earlier examples are evaluated as in Example X, but this time administration is by intravenous infusion into the contralateral femoral vein of the extract under test in 10 ml. 0.01% acetic acid. Infusions are made by a Harvard infusion-withdrawal pump at a rate of 0.5 cc. per minute. Results obtained are as follows:

| Product | Dose, mg./kg. | Mean Arterial Blood Pressure | | | | Duration of Response, min. |
|---|---|---|---|---|---|---|
| | | Control, mm. | Response, mm. | Change, mm. | Percent Change | |
| Example: | | | | | | |
| 1 | 15 | 144 | 78 | −66 | 46 | >225 |
| 2 | 0.1 | 151 | 130 | −21 | 17 | >100 |
| | 1.0 | 145 | 97 | −48 | 33 | >200 |
| | 3.0 | 163 | 52 | −111 | 68 | >270 |
| 3 | 10 | 154 | 85 | −69 | 45 | >150 |
| 4 | 1.0 | 179 | 84 | −95 | 53 | >75 |
| 5 | 1.0 | 158 | 50 | −108 | 68 | >120 |
| 6 | 3.0 | 182 | 120 | −62 | 34 | >70 |
| | 3.0 | 136 | 82 | −54 | 25 | >60 |
| 7 | 3.0 | 156 | 70 | −86 | 55 | >100 |
| 8 | 3.3 | 138 | 96 | −42 | 30 | >72 |
| 9 | 0.5 | 130 | 94 | −36 | 28 | >75 |
| | 1.0 | 122 | 83 | −39 | 32 | 80 |

The onset of blood pressure depression is quite rapid in these tests, maximum hypotension often being observed before completion of infusion.

*Example XII*

Products of the earlier examples are again evaluated as in Example X, but this time the drug is administered orally by stomach tube, with the following results:

| Product | Dose, mg./kg. | Mean Arterial Blood Pressure | | | | Duration of Response, min. |
|---|---|---|---|---|---|---|
| | | Control, mm. | Response, mm. | Change, mm. | Percent Change | |
| Example: | | | | | | |
| 1 | 50 | 146 | 116 | −30 | 21 | >100 |
| | 100 | 150 | 90 | −60 | 40 | >180 |
| 3 | 25 | 100 | 44 | −56 | 56 | >80 |

*Example XIII*

The alkaloid concentrates of the earlier examples are evaluated as in Example X, but this time an abdominal incision is made and the drugs are administered by infusion (in 10 cc. of 0.01% acetic acid) directly into the duodenum below the junction of the pancreatic duct. Results are as follows:

| Product | Dose, mg./kg. | Mean Arterial Blood Pressure | | | | Duration of Response, min. |
|---|---|---|---|---|---|---|
| | | Control, mm. | Response, mm. | Change, mm. | Percent Change | |
| Example: | | | | | | |
| 2 | 7.3 | 136 | 79 | −57 | 42 | >100 |
| 5 | 3.0 | 176 | 85 | −91 | 52 | >210 |
| 8 | 3.0 | 150 | 106 | −44 | 29 | 60 |

The onset of hypotension in this series in gradual, the maximum effect being attained 30–60 minutes after administration.

*Example XIV*

The product of Example VIII is subjected to further evaluation by the modes of administration described in Examples X, XI, and XIII, with the following results:

| Animal | Dose, mg./kg. | Route | Mean Arterial Blood Pressure | | | | Duration, min. |
|---|---|---|---|---|---|---|---|
| | | | Control, mm. | Response, mm. | Change, mm. | Percent Change | |
| Rabbit | 3.0 | IV(F) | 106 | 70 | −36 | 34 | >20 |
| | 5.0 | IV | 99 | 58 | −41 | 41 | >20 |
| Cat | 0.3 | IV | 148 | 136 | −12 | 8 | >20 |
| | 1.0 | IV | 136 | 110 | −26 | 19 | >20 |
| | 3.0 | IV | 110 | 72 | −32 | 35 | >20 |
| | 3.0 | IV(F) | 123 | 92 | −31 | 25 | >20 |
| Rat | 3.0 | IV | 130 | 105 | −25 | 20 | >20 |
| Dog | 3.0 | IV | 139 | 62 | −77 | 55 | >45 |

IV=intravenous injection.
IV(F)=intravenous infusion.

*Example XV*

The product of Example VIII is further evaluated in anesthetized dogs in which acute hypertension is produced by stripping the bilateral carotid sinuses of their nerve attachments, with results as follows:

| Dose, mg./kg. | Route | Mean Arterial Blood Pressure | | | | Duration, min. |
|---|---|---|---|---|---|---|
| | | Control, mm. | Response, mm. | Change, mm. | Percent Change | |
| 0.25 | IV | 192 | 72 | −120 | 63 | >130 |
| 1.0 | ID | 177 | 68 | −109 | 62 | >170 |

*Example XVI*

When the product of Example VIII is administered orally to mice at a level of 30 mg./kg. the animals show no evidence of ataxia, lacrimation, muscular weakness, bradycardia, flushing, cyanosis or spontaneous motor activity. Oral levels of up to 300 mg./kg. are administered with no deaths.

*Example XVII*

Ground dry bark of *Pleiocarpa mutica* is stirred with water (8 ml./g.) at room temperature for 15 hours. The slurry is filtered and to the clear filtrate is added 800 mg. sodium chloride per 100 ml. The resulting solution is evaluated for hypotensive activity by intravenous injection into a 9.2 kg. dog prepared as described in Example X.

Anaesthetization with 20 mg./kg. sodium pentobarbital plus 75 mg./kg. chloralose (both intraperitoneally administered) is followed by intravenous injection of 0.003 mg./kg. epinephrine. Blood pressure rises from 102 mm. to a maximum of 176 mm., a 72% increase, in three minutes. After another three minutes it has returned to 100 mm.

1 ml. of the *P. mutica* extract is now administered. When no effect on blood pressure is observed in 12 minutes, 0.001 mg./kg. epinephrine is administered. Pressure rises from 118 to a maximum of 145 mm. in 30 seconds. One minute following injection it has again receded to 126 mm.

At this time 2 ml. of the *P. mutica* extract is injected. For 12 minutes following injection the pressure is substantially unchanged, but then it gradually begins to fall, dropping from 118 to a minimum of 84 mm. in 30 minutes.

Epinephrine, 0.001 mg./kg. is now injected and the pressure rises to a maximum of 101 mm. in 30 seconds, then recedes to 84 mm.

5 ml. of *P. mutica* extract is administered without further significant effect, the pressure ranging from 80 to 88 mm. during 20 minutes' observation.

Post-treatment response to 0.003 mg./kg. epinephrine is now tested and found to be blocked to significant degree. The pressure rises from 80 to a maximum of 100 mm. in 3 minutes, a 25% increase as compared with the pretreatment 72%.

What is claimed is:

1. A process for the preparation of a hypotensive alkaloid concentrate which comprises subjecting a subdivided bark of *Pleiocarpa mutica* to extraction with a lower alkanol, washing an aqueous solution of said extract at a pH of from about 8 to 11 with a liquid aliphatic chlorinated hydrocarbon solvent, extracting said washed aqueous solution with a water-insoluble lower alkanol, and concentrating said extract.

2. A process for the preparation of a hypotensive alkaloid concentrate which comprises subjecting a subdivided root of *Pleiocarpa mutica* to extraction with a lower alkanol, washing an aqueous solution of said extract at a pH of from about 8 to 11 with a liquid aliphatic chlorinated hydrocarbon solvent, extracting said washed aqueous solution with a water-insoluble lower alkanol, and concentrating said extract.

3. A process as set forth in claim 2 wherein said first lower alkanol is methanol.

4. A process as set forth in claim 2 wherein said chlorinated hydrocarbon is chloroform and said water-insoluble lower alkanol is butanol.

5. A process as set forth in claim 2 wherein said alkaloid concentrate is further purified by countercurrent solvent distribution between aqueous acetic acid and 90:10 butanol:hexane.

6. A process as set forth in claim 2 wherein said alkaloid concentrate is further purified by precipitation from aqueous solution in the form of a derivative selected from the group consisting of the free base and a salt thereof, said salt being a member selected from the group consisting of picrate, nitrate, perchlorate and hydrochloride.

7. A process as set forth in claim 6 wherein said salt is the picrate.

8. A process as set forth in claim 6 wherein said salt is the nitrate.

9. A process as set forth in claim 6 wherein said derivative is the free base form of said alkaloid concentrate.

References Cited in the file of this patent
UNITED STATES PATENTS

| | | |
|---|---|---|
| 2,752,351 | Schlittler et al. | June 26, 1956 |
| 2,823,204 | Janot et al. | Feb. 11, 1958 |
| 2,938,906 | Schlittler et al. | May 31, 1960 |

OTHER REFERENCES

Biological Abstracts, vol. 26 (1952), Entry 4303.